No. 757,941. PATENTED APR. 19, 1904.
H. P. MAXIM.
MOTOR VEHICLE RUNNING GEAR.
APPLICATION FILED JULY 11, 1903.
NO MODEL. 2 SHEETS—SHEET 1.
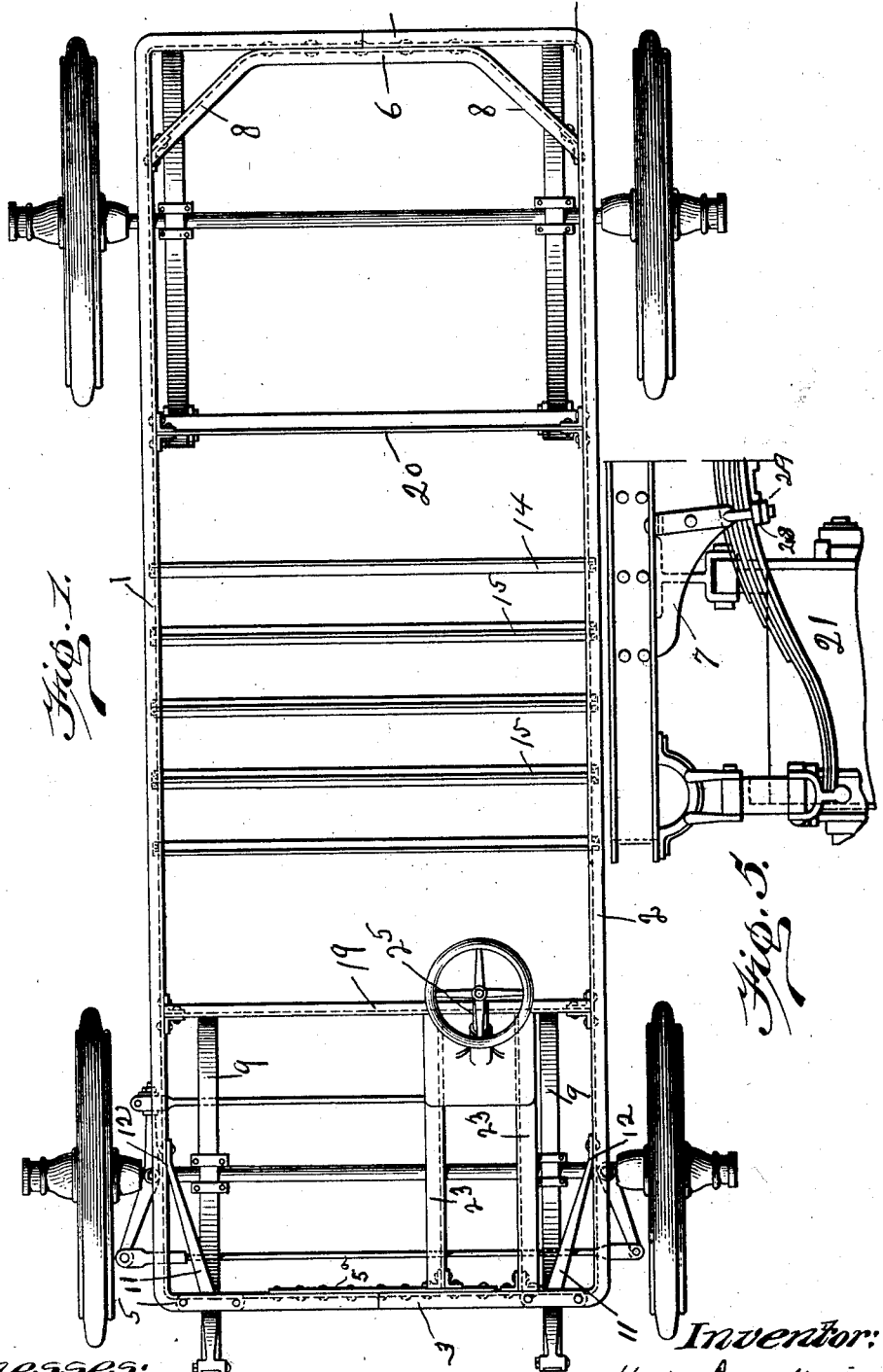

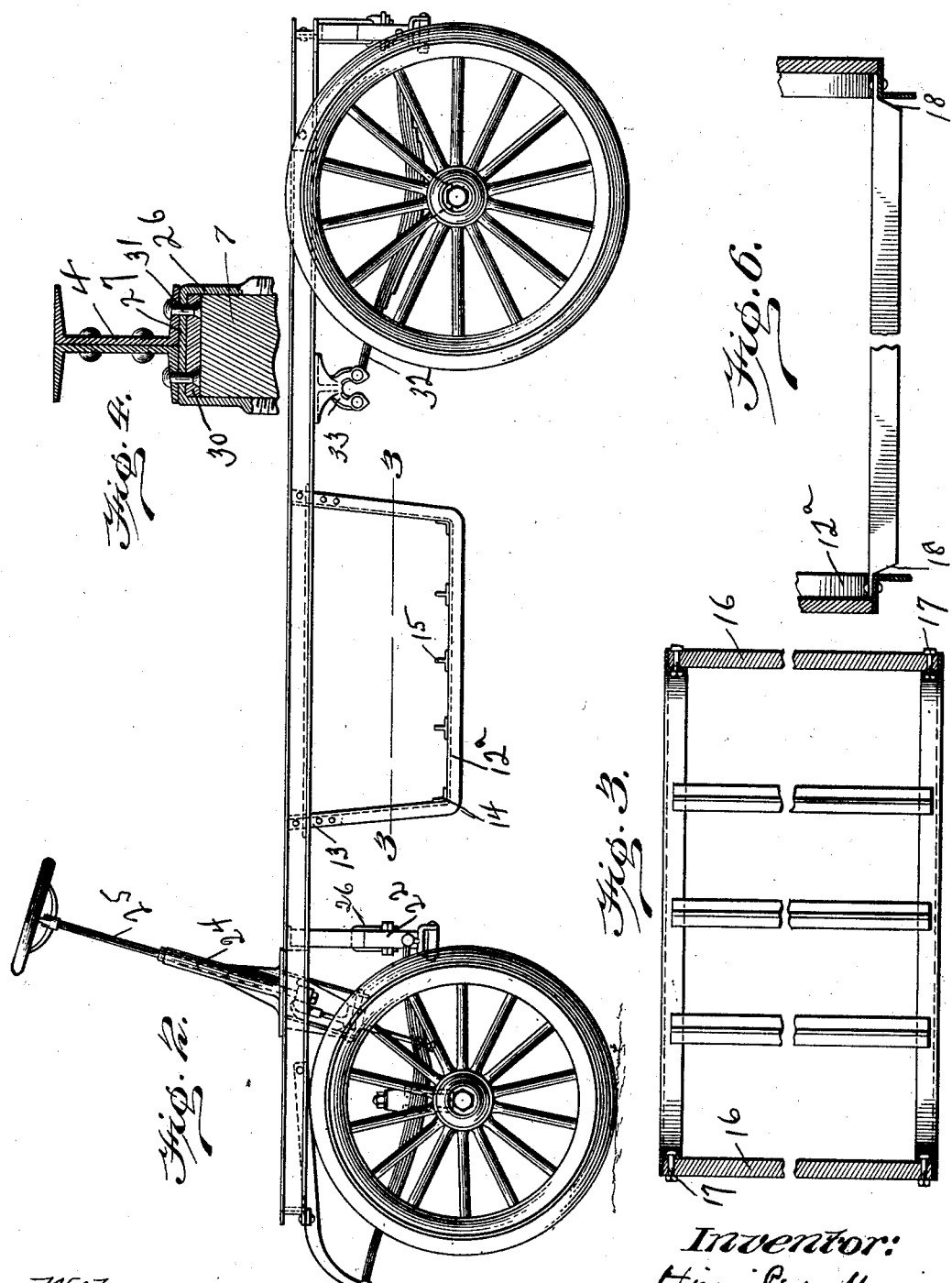

No. 757,941. Patented April 19, 1904.

UNITED STATES PATENT OFFICE.

HIRAM PERCY MAXIM, OF PITTSBURG, PENNSYLVANIA.

MOTOR-VEHICLE RUNNING-GEAR.

SPECIFICATION forming part of Letters Patent No. 757,941, dated April 19, 1904.

Application filed July 11, 1903. Serial No. 165,107. (No model.)

*To all whom it may concern:*

Be it known that I, HIRAM PERCY MAXIM, a resident of Pittsburg, in the county of Allegheny and State of Pennsylvania, have invented a new and useful Improvement in Motor-Vehicle Running-Gear; and I do hereby declare the following to be a full, clear, and exact description thereof.

My invention relates to running-gear frames for vehicles, and more especially for motor-vehicles, the object being to provide a running-gear frame which is self-contained and of standard form and which can be manufactured from standard material and sold to vehicle-builders, so that they need only supply the body, thus obviating any necessity of the ordinary vehicle-builder concerning himself about the motor apparatus and accessories.

One of the difficulties which ordinary vehicle-builders meet with in the construction of motor-vehicles is the engineering problems which are presented in the construction of proper motive-power apparatus for this class of vehicles. The majority of vehicle-builders are not competent or equipped to satisfactorily deal with these problems, and as a consequence the building of motor-vehicles is confined to a few specially-equipped factories.

The object of my invention is to provide a standard running-gear frame for motor-vehicles which is self-contained and includes in addition to the motive-power apparatus the necessary frame for supporting the body, the battery and motor, steering-gear, brakes, and other details, and which is built and assembled in this shape and can then be sold to vehicle-builders, who need merely mount thereupon their own wagon or truck bodies, in this way enabling ordinary vehicle-builders to construct motor-vehicles as well as horse-vehicles.

In the accompanying drawings, Figure 1 is a plan view of a running-gear frame constructed according to my invention. Fig. 2 is a side view of the same. Fig. 3 is a sectional view through the battery-support, showing the manner of applying the boarding thereto. Fig. 4 is a section through the rear end of frame. Fig. 5 is a partial rear end view, and Fig. 6 is a modification, of the battery-support.

My running-gear frame is constructed almost entirely of metal, and preferably structural or other commercial shapes are employed as far as possible. The frame itself comprises the usual side and end bars and suitable connecting means. The side bars 1 and 2 and end bars 3 and 4 are formed of sections of flanged bar, preferably channel-bars, two such sections being employed, each having its ends bent at right angles to the main portion thereof, so as to form wide shallow U shapes, the bend being on a large curve 5 to form neat corners. The ends of these two sections meet at the longitudinal center of the frame and are there united by suitable splice members. At the front end of the vehicle the splice member preferably is an ordinary flat bar $5^a$, which is riveted to the webs of the meeting sections. At the rear end the splice-bar is formed of a flanged shape and preferably a channel-section 6, as shown, so placed that its lower flange is flush with the lower flanges of the channel-bar sections in order to provide a wide base for the spring-bar 7. The ends of this rear splice-bar preferably are bent obliquely, as at 8, and are riveted to the side bars 1 and 2, thus serving as corner-braces to prevent the frame from springing into diamond shape when the vehicle is violently backed against a curb or loading-platform in such manner that one wheel strikes before the other.

At the front end of motor-vehicles the only practical way to attach the springs 9 to the frame is to project bars 11 forwardly, to the end of which bars the springs are attached. In my construction these bars are riveted to the end bar 3 of the frame a slight distance from the corner thereof, and the inner ends of said bars 11 are bent outwardly, as at 12, and are riveted to the side bars 1 and 2, so that said bars 11 serve not only as the spring-hangers, but also as front corner-braces.

The battery-support is formed by attaching to the side bars 1 and 2 flanged bars $12^a$ of approximately U shape, these bars preferably being angle-bars and being secured to the side bars by auxiliary pieces 13 to provide a rigid fastening. They are connected transversely by angle-bars 14 and T-bars 15, which form the guides on which the battery-boxes are slid in. The flanges of the angle-bars $12^a$ furnish a convenient fastening for the wooden boarding 16 at the front and rear sides of the battery-compartment, these boards being secured to the flanges of the angle-bars by ordinary bolts 17 and serving to protect the battery from dirt and also to give a finish to the compartment. The boards at the front side are provided with openings for providing ventilation to the batteries. For some forms of battery-supports the cross connecting members preferably are placed with their flanges projecting downwardly, as shown in Fig. 6, the downwardly-projecting flanges of these bars being cut away at the ends, as at 18, to provide suitable means for attaching said bars to the U-shaped bars $12^a$. With this construction the battery-boxes can be placed directly in contact with each other, thus overcoming the tendency of said battery-boxes to rattle or strike against each other.

The main side bars of the frame are connected at intervals by the cross connecting-bars 19 and 20, which preferably are of angle shape and connected to the side frames by short sections of angle-bar arranged vertically, as shown. The front bar 19 serves as a means for fastening the cross-spring 22, connecting the rear ends of the front springs 9, and the rear bar 20 serves as a means for hanging the motor 21. To serve their functions, the bar 19 is placed with its horizontal flange at the top, and the bar 20 is placed with its horizontal flange at the bottom, so that the motor-hanger can be riveted thereto. Extending from the front bar 3 of the frame to one of these cross-bars 19 are two longitudinal bars 23, placed a slight distance apart, and resting on these bars is the steering-gear standard 24, having the steering-shaft 25 projecting down between said bars and connected to the running-gear in any desired manner.

The spring construction, the axle, and the wheels may be of any standard construction, my frame being so constructed that standard details may be employed in connection therewith.

The rear spring-bar 7 is secured to the running-gear frame by means of metal clips 26, these being U-shaped, as shown, having the base 27 formed flat and having depending legs, which are round and threaded at their lower ends to receive the securing-bar 28 and nuts 29. These clips are fastened to the rear end bar 4 of the frame, preferably by riveting to the flanges of the latter, and in order to strengthen the same a flat filling-piece 30 is placed in said clips at the base thereof, and the securing rivets or bolts 31 are countersunk in this filling-piece. The motor is hinged to the frame, and the hanger 33 for the springs 32 is preferably provided with two eyes, to one of which the spring is attached and to the other of which the motor is hinged.

The running-gear frame described is simple of construction and strong. It can be made in standard form for different sizes or types of vehicles and is entirely self-contained, so that it can be sold to ordinary vehicle-manufacturers, and they will be able to provide the same with their own bodies. In this way the vehicle-builder will be relieved of all engineering problems which unavoidably arise in the construction of these vehicles.

What I claim as my invention, and desire to secure by Letters Patent, is—

1. A running-gear frame for vehicles comprising two sections of structural metal shapes each having its ends bent at right angles to its body, the ends of said sections meeting at the longitudinal center of the vehicle, and splice members for securing said sections together, the splice member at the rear end having a broad lower face to serve as a base for the spring-bar.

2. A running-gear frame for vehicles comprising two sections of flanged structural shapes each having its ends bent at right angles to its body, said sections having their ends meeting at the longitudinal center of the vehicle and having a flange at the lower end, edge splice members for securing said sections together, the splice member at the rear end and flanged member having a bottom flange flush with the lower flange of the sections to give a broad base for the spring-bar.

3. A running-gear frame for vehicles comprising two sections of channel-bar each having its ends bent at right angles to its body, the ends of said sections meeting at the longitudinal center of the vehicle, and splice members for securing said sections together, the splice member at one end being a section of channel-bar having its bottom flange flush with the lower flange of the main channels to provide a broad base for the spring-bar.

4. A running-gear frame for vehicles comprising two sections of structural metal shapes each having its ends bent at right angles to its body, the ends of said sections meeting at the longitudinal center of the vehicle, and splice members for securing said sections together, the splice member at one end having its ends bent obliquely and secured to the side bars thereby serving as corner-braces.

5. A running-gear frame for vehicles comprising two sections of channel-bar each having its ends bent at right angles to its body, the ends of said sections meeting at the longitudinal center of the vehicle, and splice members for securing said sections together, the splice member at the rear end being a flanged shape having a bottom flange flush with the lower flange of the channel-bars and having its ends bent obliquely and secured to the side members, thereby serving as corner-braces.

6. A vehicle running-gear frame composed of side and end members of structural shapes, connecting means therefor, and spring supporting-bars secured to one end member adjacent the corners, said bars having their inner ends bent outwardly and secured to the adjacent side members thereby serving as corner-braces.

7. A vehicle running-gear frame comprising metallic side and end members, connecting means therefor, cross connecting-bars between said side members, two longitudinal members running from one end member to a cross connecting member, and steering-gear mounted between said longitudinal members.

8. A running-gear frame for vehicles comprising metallic side and end members, connecting means therefor, a metallic clip secured to the lower edge of one end member, said clip comprising a flat horizontal portion and depending legs, and a spring-bar secured by said clips.

9. A vehicle running-gear frame comprising metallic side and end members, connecting means therefor, a metallic clip comprising a flat horizontal portion and depending legs, a filling-piece at the base of said clip, securing means passing through said filling-piece, said clip, and one end member of the frame, and a spring-bar secured by said clip.

10. A running-gear frame for vehicles comprising side and end members of flanged shape having a flange on the lower edge, splice members for connecting said members together, the splice member at one end of the frame being a flanged shape having a lower flange flush with the lower flange of the end member, a spring-clip of U shape having a flat base riveted to the flanges of the end and splice member and having depending legs, and a spring-bar secured by said clip.

11. A running-gear frame for vehicles comprising side and end members, a battery-support comprising longitudinally-arranged angle-bars having their ends secured to the side members and their intermediate portions depressed below said side members, cross-bars connecting said angle-bars, and boards secured to the flanges of said angle-bars and serving to inclose the batteries.

12. A running-gear frame for vehicles comprising metallic side and end members, a battery-support comprising longitudinally-arranged bars having their ends secured to the side members and their intermediate portions depressed below said side members, and cross-bars connecting said longitudinal bars, said cross-bars being flanged shapes placed with their flanges downwardly and having said flanges cut away at the ends to provide a flat portion for securing to the longitudinal bars.

13. A vehicle running-gear frame comprising metallic side and end members, connecting means therefor, and a double-eyed bracket connected to said frame, one eye serving for the attachment of a spring and the other for the attachment of a motor.

14. A vehicle running-gear frame comprising metallic side and end members, connecting means therefor, a cross-bar connecting said side members and a double-eyed bracket connected to said cross-bar, one eye serving for the attachment of a spring and the other for the attachment of a motor.

In testimony whereof I, the said HIRAM PERCY MAXIM, have hereunto set my hand.

HIRAM PERCY MAXIM.

Witnesses:
  W. C. H. BARKER,
  E. P. COFFRIN.